（12） United States Patent
Travers

(10) Patent No.: US 11,029,523 B2
(45) Date of Patent: Jun. 8, 2021

(54) NEAR-EYE DISPLAY WITH SELF-EMITTING MICRODISPLAY ENGINE

(71) Applicant: Vuzix Corporation, West Henrietta, NY (US)

(72) Inventor: Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/797,968

(22) Filed: Feb. 21, 2020

(65) Prior Publication Data

US 2020/0192102 A1 Jun. 18, 2020

Related U.S. Application Data

(63) Continuation of application No. 15/305,293, filed as application No. PCT/US2015/040928 on Jul. 17, 2015, now Pat. No. 10,816,798.

(Continued)

(51) Int. Cl.
*G02B 27/01* (2006.01)
*H04N 13/332* (2018.01)
(Continued)

(52) U.S. Cl.
CPC .......... *G02B 27/0172* (2013.01); *G02B 6/00* (2013.01); *G02B 6/0001* (2013.01); *G02B 6/0016* (2013.01); *G02B 6/0035* (2013.01); *G02B 27/01* (2013.01); *G02B 27/017* (2013.01); *G02C 7/10* (2013.01); *G06F 3/011* (2013.01);
(Continued)

(58) Field of Classification Search
CPC ............ G06T 19/006; G09G 2320/066; G09G 2360/144; G02B 27/01; G02B 2027/0118; G02B 27/017; G02B 27/0172; G02B 6/00; G02B 6/0001; G02B 6/0016; G02B 6/0035; G02B 27/0081; G02B 2027/0187;
(Continued)

(56) References Cited

U.S. PATENT DOCUMENTS 8,681,073 B1 * 3/2014 Robbins ........... H04N 21/42202
345/7
2011/0032266 A1 * 2/2011 Harbach .................. G09G 3/20
345/589

(Continued)

OTHER PUBLICATIONS

European Office Action for Application No. 15821529.3 dated Oct. 31, 2018. (Year: 2018).*

*Primary Examiner* — Jeffery A Brier
(74) *Attorney, Agent, or Firm* — Thomas B. Ryan, Patent Agent; Jacob D. Merrill, Esq.; Harter Secrest & Emery LLP

(57) ABSTRACT

A near-eye display for an augmented reality display system couples a self-emitting microdisplay to a transmissive waveguide through an input coupler. Light from the self-emitting microdisplay propagates along the waveguide and through an output coupler for generating a virtual image that is visible together with a real-world scene through the waveguide within an eyebox located in front of the output coupler. A light sensor detects light levels within different portions of the real world scene visible within the eyebox. Drive electronics control the light output from individual pixels of the self-emitting microdisplay to preserve desired local contrast values between the virtual image and the real-world scene.

24 Claims, 4 Drawing Sheets

Related U.S. Application Data

(60) Provisional application No. 62/026,373, filed on Jul. 18, 2014.

(51) Int. Cl.
| | |
|---|---|
| *F21V 8/00* | (2006.01) |
| *G02C 7/10* | (2006.01) |
| *G02B 6/00* | (2006.01) |
| *G06F 3/01* | (2006.01) |
| *G06T 19/00* | (2011.01) |
| *G02B 27/00* | (2006.01) |

(52) U.S. Cl.
CPC ......... *G06T 19/006* (2013.01); *H04N 13/332* (2018.05); *G02B 27/0081* (2013.01); *G02B 2027/014* (2013.01); *G02B 2027/0118* (2013.01); *G02B 2027/0138* (2013.01); *G02B 2027/0178* (2013.01); *G02B 2027/0187* (2013.01); *G09G 2320/066* (2013.01); *G09G 2320/0626* (2013.01); *G09G 2360/144* (2013.01)

(58) Field of Classification Search
CPC .......... H04N 5/57; H04N 5/58; H04N 13/332; G02C 7/10; G06F 3/011
See application file for complete search history.

(56) References Cited

U.S. PATENT DOCUMENTS

| | | | |
|---|---|---|---|
| 2011/0096401 A1* | 4/2011 | Levola ............... | G02B 27/0172 359/573 |
| 2011/0221793 A1* | 9/2011 | King, III ................. | G06F 3/013 345/690 |
| 2013/0063486 A1* | 3/2013 | Braun ................ | G02B 27/0172 345/633 |
| 2013/0114043 A1* | 5/2013 | Balan ..................... | A61B 3/113 351/210 |
| 2014/0160014 A1* | 6/2014 | Dominici ............... | G02B 27/01 345/156 |

* cited by examiner

NEAR-EYE DISPLAY WITH SELF-EMITTING MICRODISPLAY ENGINE

TECHNICAL FIELD

The invention relates to compact display systems, particularly such systems designed to produce magnified virtual images of generated patterns that are overlaid upon a real-world view, produced by microdisplay engines and to such systems that can be arranged for near-eye viewing within head-mounted frames or that can be arranged for viewing within prescribed exit pupils.

BACKGROUND

Augmented reality systems, which add computer enhancements to an individual's otherwise unobstructed field of view (FOV), are featured in applications ranging from enterprise to defense to entertainment. Various attempts have be made to produce portable (wearable) devices, such as glasses or safety goggles, capable of presenting high resolution, dynamic digital information within the user's unobstructed field of view of the world. High dynamic range photonic level environments to which the human eye adopts using its pupils, lens, and eyelids present additional challenges. Whether for head-up display (HUD) applications or full mixed and augmented reality training simulations, small, inexpensive, ruggedized solutions are needed.

Various approaches have been tried to present digital image information to users. The information can be provided in an immersive environment to the user or overlaid atop the user's otherwise unimpeded view of the world. A conventional approach uses bulky optics, glass lenses, and beam splitters that approach the size of a football helmet, especially if a large field of view is desired. Additionally, these bulk optics approaches have difficulty providing the user with high dynamic range virtual images at the same time as unimpeded views of the world.

To circumvent the drawbacks of bulky optics, compact near-eye displays can use plate-shaped (usually planar) waveguides for transmitting angular image information to users' eyes as virtual images. Image information is generally input near one end of the waveguides and is output near another end of the waveguides. The image information propagates along the inside of the waveguides as a plurality of angularly related beams that are internally reflected along the waveguide. Diffractive optics (e.g. gratings) and refractive optics (e.g. prisms) are often used to couple image information into the waveguides. Rays having incident angles that are totally internally reflected within the waveguides are then output by matching diffractive or refractive output couplers forming an exit pupil that can be aligned with the users' eyes. Often the waveguide and associated diffractive optics at the output end of the waveguides are at least partially transparent so that the user can also view the ambient environment through the waveguides. Such transparency becomes useful especially when (a) such image information is not being conveyed by the waveguides, (b) the image information does not fill the entire field of view, or (c) additional virtually reality content is overlaid over the ambient environment.

Due to their planar thin geometries, diffraction gratings provide a compact means to couple light into and out of waveguides. With proper design, the virtual image output maintains the same angles as the virtual image input, resulting in planar waveguides that translate image content along the length of the waveguide. In addition, intermediate gratings can be used to expand the exit pupil to sizes that are considerably larger than the size of the entrance pupil. Gratings placed between the input and output gratings can be designed to expand the exit pupil in one or two dimensions using so-called 1D (one-dimensional) or 2D (two-dimensional) expanders. In the case of 1D expanders, light that is injected into the waveguide maintains the angular relationship of coupled light along the direction of propagation, except the image content is output over a wider exit pupil. Such beam expanders can also be used to reduce the dimension of the injection optics along the propagation direction, thereby reducing bulk and cost. However, 1D (one dimensional) expanders do not expand the pupil in the orthogonal direction. Larger injection optics can be used to reduce this problem but this approach requires larger optical components, which can significantly increase system cost and bulk. 2D (two dimensional) pupil expanders have significant advantages since they allow the use of injection optics which can be smaller in two dimensions, and can thereby be much lighter and fit into form factors ideal for near-eye displays.

To couple image content into waveguides, injection optics often use spatial light modulator microdisplays that modulate light incident of each display pixel along with projection optics to create virtual images. However, transmissive spatial light modulators used in this manner can be optically inefficient thereby increasing power requirements of the light source. Consequently, illumination sources such as light emitting diodes (LED's) must be driven with higher currents, increasing power consumption and heating. Reflective spatial light modulators such as liquid crystal on silicon (LCoS) or DLP (Digital Light Processing) can be optically more efficient and are used in a number of applications such as digital projectors. However, since transmissive or reflective systems modulate incident light rather than emit light, they require additional optics that project, condense, and split output beams from the LED sources. Although much effort in the industry has been devoted to miniaturizing "engines" that integrate displays, sources, projection optics, beam splitters, polarizers, heat sinks, etc., state-of-the-art dimensions are still undesirably large for near-eye displays (i.e., on the order of 25 mm×25 mm×8 mm or larger). Additional drawbacks associated with current engine technology negatively affect cost, size, weight, and power. Since these displays only modulate incident light, the light source must remain turned on regardless of image content. For example, a bright full-screen virtual image and a simple arrow that takes up only 5% of the display pixels will consume approximately the same power.

Self-emitting displays can circumvent many of the aforementioned problems. Inorganic and organic LED arrays (OLED) produce light on a pixel-by-pixel basis to produce the desired image. Self-emitting pixel-addressable displays such as OLED consume power depending on how many pixels are addressed and specific brightness of each pixel addressed. This pixel-power addressable approach can substantially decrease power consumption. Contrast ratio can also be improved since when pixels are turned off, no light is emitted and background light is largely limited to other system reflections or flare, which in practice can be nearly eliminated. Another significant advantage of self-emitting pixel-addressable displays is that such displays do not require projection optics to illuminate the spatial light modulator display. Therefore, no internal illumination beam projection optics, beam splitters, etc. are required.

In spite of their many advantages, self-emitting displays, such as OLED's, are generally considered impractical for use with diffractive waveguide-based near-eye displays. Self-emitting devices are typically Lambertian emitters, emitting light over large extended angles that are inefficiently coupled into the projection optics. Although fast optics can improve optical efficiency to some extent, fast optics can negatively affect the angular distribution of the light coupled into the waveguide, or result in poor coupling efficiency. Additionally, the quantum efficiency of OLED devices is low, resulting in relatively low brightness. For these reasons, displays of choice for diffractive waveguides that include 2D expanders continue to be spatial modulator displays illuminated by separate light sources. For these reasons, there are currently no viable microdisplay systems that incorporate diffractive waveguides and self-emitting displays having high optical output and low power consumption with compact geometries and form factors.

SUMMARY

The invention in one or more of its preferred embodiments features a highly compact, power efficient, near-eye display system incorporating high-power "pixel power" adjustable self-emitting microdisplays that can be physically coupled on waveguides and can include diffractive input and output couplers and 2D pupil expanders, along with sensors and electro-optical windows, which together provide for a low-power display with virtual to real-world contrast management. Unlike waveguide-based near-eye displays thus far found in the prior art, preferred versions of the invention do not require image projection optics that use separate light sources and spatial light modulators. Digital imagery coupled by an input grating into the waveguide is preferably produced by a self-emitting display that is pixel-power addressable—that is, the display requires power only when pixels are activated. As a result, power consumption of the display is based on image content unlike current waveguide near-eye displays that require constant illumination of transmissive or reflective spatial light modulators.

Another significant advantage of the pixel-power addressable characteristics in the self-emitting microdisplays envisioned for the preferred embodiments of the invention is a significant improvement of contrast ratios. Other approaches that project light emanating from a uniformly illuminated spatial light modulator require high on-to-off ratios from the device. Widely used LCoS microdisplays suffer from low contrast ratios, often exhibiting ratios significantly lower than 500:1. Higher contrast is possible but at the expense of reduced illumination and the addition of complex compensators, including polarizers, polarization beam splitters, and other elements. In the case of the envisioned self-emitting displays, when power is not applied to a pixel, the pixel is off—resulting in no light emission and very high contrast.

High output self-emitting displays that produce narrower angular distribution output than Lambertian sources can be used to increase the percentage of light that can be coupled into the waveguide, as well as the image brightness at the exit pupil. Improved optical efficiency also results in lower power consumption since the image source can be run at lower level.

Another significant advantage of pixel-power addressable display sources is that the collective average pixel power can be adjusted to maximize the virtual image contrast against the real-world view. The average and localized power output of the pixel-power addressable display sources can be adjusted as a function of the real-world scene to adjust the brightness of the virtual scene as a function of brightness levels within the real-world scene.

2D (two dimensional) expander gratings allow the use of small displays and associated projection optics while still achieving a sufficiently large exit pupil for the user. The absence of a pupil expanding embodiment or even 1D pupil expanders requires that large virtual image inputs beams be projected onto an input coupler (e.g., grating), thereby increasing system bulk. Additionally, large area input gratings used without pupil expanders or even 1D expanders occupy additional areas on the waveguide, increasing waveguide dimensions, materials, and manufacturing cost.

Embodiments of the invention enable a degree of miniaturization not possible with current technologies. In the prior art, the pixelated image is generally projected using a separate, projection display "engine" that must be mechanically positioned and aligned relative to the waveguide's input grating. In contrast, preferred embodiments of this invention feature an integral virtual image generating engine that is monolithically attached to the planar waveguide. As a result, system compactness is significantly increased, there is less need to fold the various optical subsystems, and the mechanical robustness of the system is greatly enhanced. All these attributes enable the design of near-eye robust eyewear that resembles conventional glasses, safety glasses for industrial applications, and other desirable forms of wearable virtual reality systems. The significant size reduction of the optical system also frees up additional space for associated electronics subsystems, wireless capability, gesture monitors, light sensors, digital image capture sensors and electronics, and more.

Further, with the addition of sensors to measure the real-world scene characteristics like brightness in one-dimensional or two-dimensional space, further embodiments of this invention enable an active contrast control allowing the pixel-power-addressable display to adjust both local and overall display intensities and hence allows for optimum contrast to power ratios and contrast matching based on the scene illuminations, for instance, a cloudy day versus a bright sunny day. In each case, the average pixel power (instead of the entire display power) can be adjusted for optimum performance as a function of the scene differences.

With the addition of electrochomic windows in front of the waveguides, scene brightness compared to the virtual image brightness can be further controlled, allowing for lower power consumption and better virtual to scene matching. Local concentrations of light within the transmitted real-world image can be adjusted by the electrochromic window to preserve desired contrast with the generated virtual image throughout the field of view In addition to controlling the overall or local brightness of the real image through a modulator or as an alternative thereof, the virtual image of the pixel-power-addressable display can be controlled on a pixel-by-pixel basis to achieve a desired contrast overlaid upon the real-world scene. That is, the desired contrast can be maintained throughout the field of view despite variations in the illumination levels within the real-world scene. Sensors can monitor the incoming light from the real-world scene throughout the field of view and the output power of the pixels generating the overlaid virtual image can be adjusted in accordance with the sensed incoming light levels of their immediate backgrounds or surroundings. Thus, pixels overlaying areas within the visible real world scene that are relatively dim can be driven at lower power levels than pixels overlaying areas within the visible real world scene that are relatively bright to maintain desired levels of contrast for the overlying virtual images.

Embodiments of this invention contemplate not only small, low-power display engine optics for wearable displays but also closed-loop active scene/virtual display modulation engines to best control the power consumption and virtual-to-scene image matching.

Near-eye displays envisioned in various embodiments of this invention offer simplicity, compactness, lower weight, lower power consumption, reduced localized heating, and greater robustness, greater contrast ratios, and potential lower cost, as well as a greater range of applications over what has been possible in the prior art.

BRIEF DESCRIPTION OF THE DRAWING FIGURES

DETAILED DESCRIPTION

Figure 1:
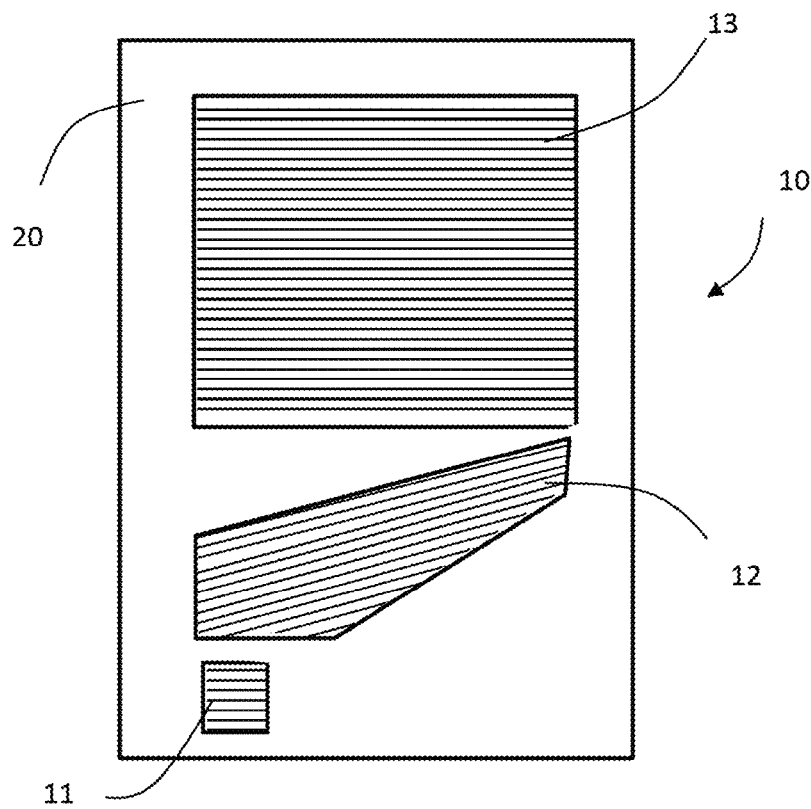
FIG. 1 is a diagrammatic back view (i.e., facing the user's eye) of a waveguide including input and output coupling gratings and beam expander grating.

FIG. 1 shows a waveguide 10 that includes an input coupler grating 11, a 2D pupil expander grating 12, and output coupling grating 13 supported by an optically transparent plane-parallel substrate 20. Gratings 11, 12, and 13 can be replicated on the substrate 20 using a polymeric material of similar refractive index to the substrate or created as part of the substrate itself. The gratings can be patterned using microlithographic, holographic, stamping, and etching methods well known in the art. Although the refractive index of substrate 10 and gratings 11 through 13 could be similar to standard glass (e.g. 1.5), higher refractive indices such as 1.7 are preferred to maximize the range of angles and number of modes that can be coupled into the waveguide 10. Both plastic and glass substrates can serve as acceptable substrates as long as the two (front and back) surfaces are highly parallel and are sufficiently transmissive to propagate coupled modes without significant loss across the waveguide. As an example, waveguide 10 can have a length of approximately 60 millimeters for reaching the eye position and a height of approximately 30 millimeters and a thickness of 1 to 2 mm to support the propagation of the desired modes. Other configurations such as stacked waveguides, curved waveguides, grating pitches tailored to desired wavelengths, are well known in the prior art. It should be noted that this invention is not limited to any specific waveguide geometry or configuration.

Figure 2:
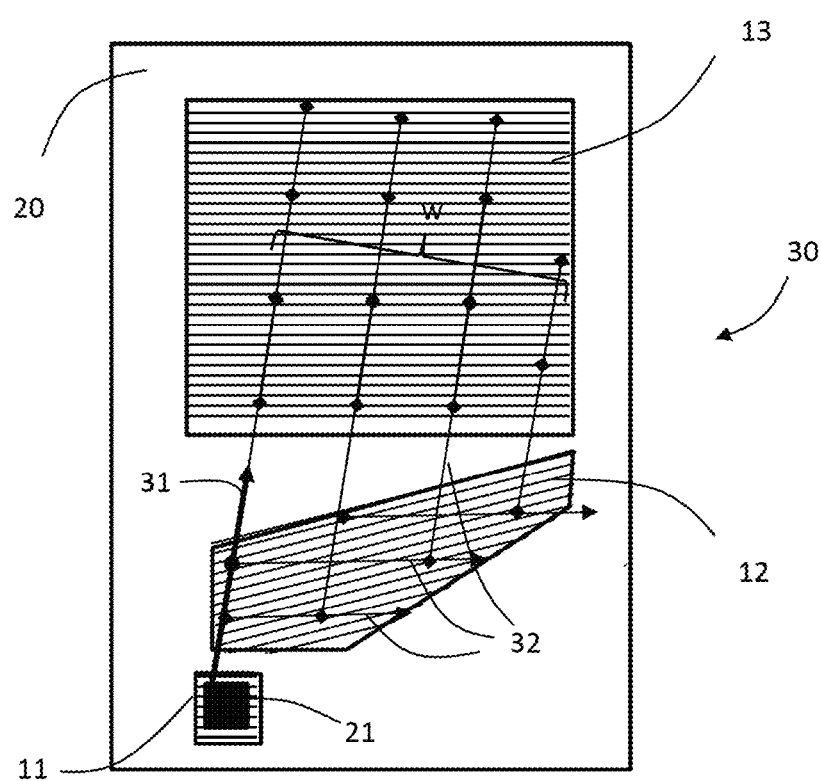
FIG. 2 is a diagrammatic back view of the waveguide including the input and output coupling gratings and the beam expander grating, as well as a self-emitting microdisplay system positioned over the input coupler grating, and a trajectory of a coupled ray propagating through the beam expander grating and output coupler grating.

FIG. 2 shows a waveguide 30 similar to the waveguide of FIG. 1 but with the addition of a self-emitting microdisplay system 21. The self-emitting microdisplay system 21 is positioned directly over input grating 11 and emits light in the direction of the grating. By controlling a number of grating and system properties, output rays from 21 can be efficiently coupled into the waveguide. For example, assume that a ray 31 as shown in FIG. 2 is coupled into the waveguide and propagates in the direction of the 2D expander grating 12. The 2D expander grating pattern is angularly oriented relative to the direction of the propagation direction of the coupled rays. As a result, it produces a large number of multiply reflected orders 32 which expand the narrow input beam 31 into a broader width labeled "w" in FIG. 2. Since the image input to input grating 11 is composed of many rays ranging in position and angle, a large and practically continuous set of coupled orders propagates toward output grating 13. If the output grating 13 matches diffractive characteristics of input grating 11, output rays will preserve angles of the incident rays illuminating the input grating 11. To view images, the observer places his or her eye within an eyebox in front of the output grating 13 and thereby receives the image content originally injected by the self-emitting microdisplay system 21.

Figure 3:
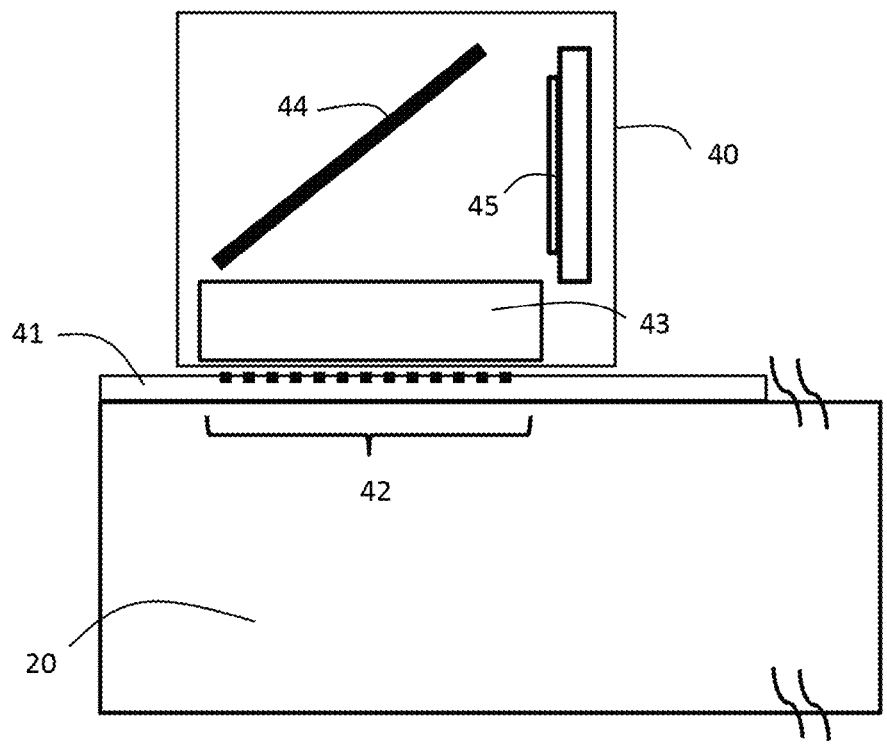
FIG. 3 is a cross-sectional view of the input coupler including the waveguide, a grating structure, mirror-based folded optics, projection optics, and a self-emitting microdisplay.

A cross-sectional side view of the region around the input coupling is shown in FIG. 3. Waveguide substrate 20 supports a layer 41 having a refractive index approximately equal to the substrate 20. A grating pattern area 42 imprinted or replicated using methods well known in the art defines the dimensions of input grating 11. Although FIG. 3 depicts a vertical grating pattern for convenience, the grating structure (not to scale and greatly magnified) can be tilted from vertical alignment to improve coupling efficiency.

Figure 4:
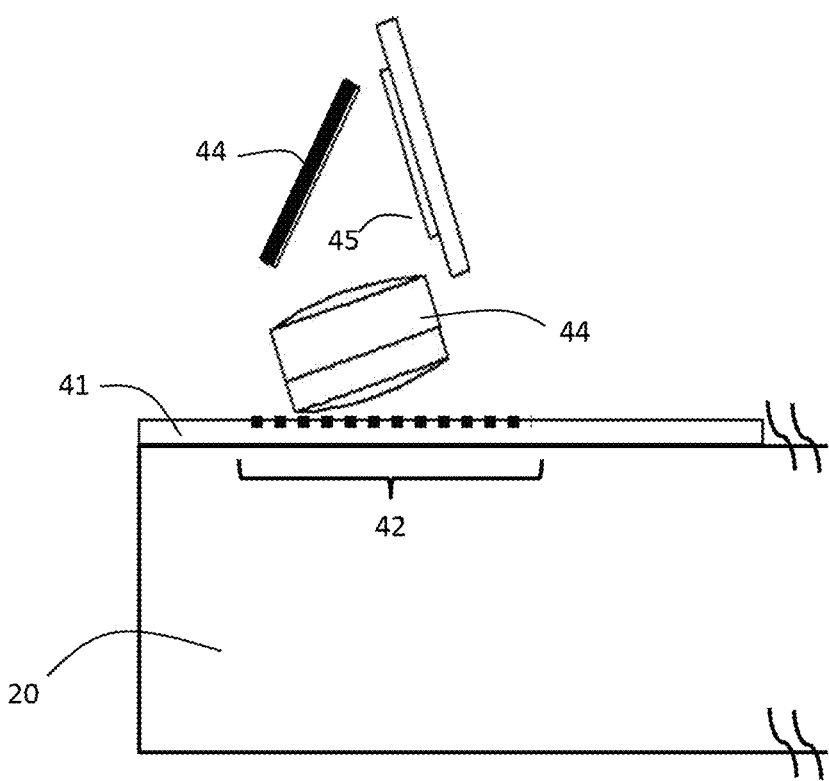
FIG. 4 depicts and off-axis example of FIG. 3 that uses a doublet for the imaging optics.

The self-emitting microdisplay system 40 shown in FIG. 3 is positioned directly over grating pattern area 42. The system 40 includes positive imaging optics 43, a folded optics mirror 44, and a self-emitting microdisplay 45. Folded optics mirror 44 is an optional feature that can be included to reduce the dimensions of the self-emitting microdisplay system 40. Depending on imaging requirements, imaging optics 43 can include a positive singlet, a doublet, and have additional elements, as well as elements corrected for chromaticity. The focal length of the imaging optics 43 is preferably chosen such that microdisplay 45 resides at approximately the focal plane of the imaging optics 43. Although FIG. 3 shows a system with its optical axis normal to waveguide 20, in some cases a tilt from normal incidence would be desirable. In such cases, elements of the system 40 would be respectively tilted to achieve a good virtual image. FIG. 4 illustrates an off-axis example that uses a doublet lens 44 for the imaging optics.

Figure 5:
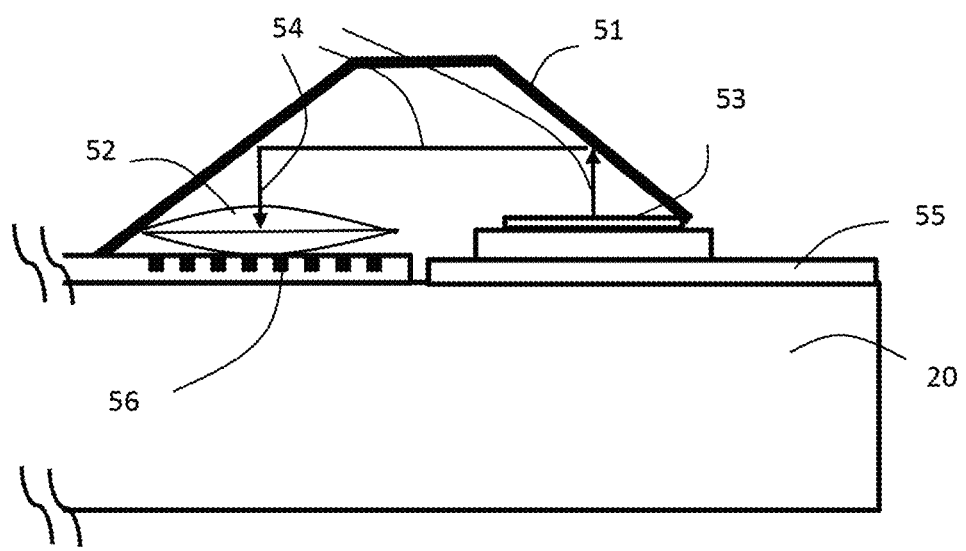
FIG. 5 is a cross-sectional view of the input coupler including the waveguide, a grating structure, prism-based folded optics, projection optics, and self-emitting microdisplay.

Further integration and size reduction is possible using other folded optics approaches. FIG. 5 depicts a more highly folded system that includes a prism-shaped reflecting structure 51, positive imaging optics 52, and a self-emitting microdisplay 53. In this case, light emanating from self-emitting microdisplay 53 follows optical path 54 through two reflections. Preferably, positive imaging optics 52 have a focal length coinciding with the total optical path length of 54. Either mirror-based, plastic-based, or glass-based elements may be used for the reflecting structure 51. In addition to the smaller form factor, the self-emitting microdisplay 53 can be mounted coplanar to the waveguide surface. The coplanar surface mounting can improve manufacturability and result in greater physical integrity. Furthermore, a planar heat sink 55 can be integrated directly onto the waveguide to further improve compactness and mechanical robustness. The planar heat sink 55 can be slightly shimmed away from the waveguide to provide a small air gap needed to sustain TIR (total internal reflection) conditions. If the heat sink 55 is directly attached to the waveguide (e.g. glued), the input grating 56 can be designed such that the primary coupled modes travel in a direction away from the heat sink 55 (i.e., toward the left in FIG. 5). Although the grating in FIG. 5 resides on the waveguide surface adjacent to positive imaging optics 52, in some cases, it may be desirable to place input grating 56 on the opposite face of the waveguide substrate 20 for performing in a similar manner as a reflection grating.

The embodiments of this invention enable extremely compact, planar, and power efficient near-eye display systems. The pixel-power addressable characteristics of the self-emitting microdisplays provide benefits including lower power consumption, decreased heating of the display and discomfort to the user, relaxed requirements on heat sinking and thermal management which could otherwise increase system bulk, and lower requirements for battery power resulting in more compact or longer-lasting batteries.

Figure 6A:
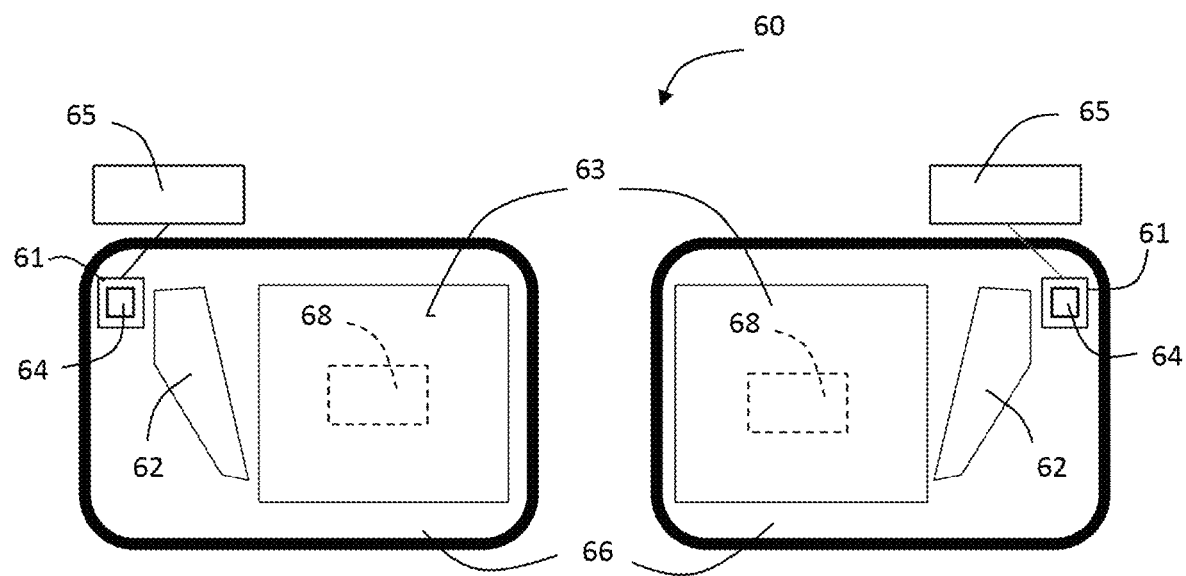
FIG. 6a shows a front view of a compact and power efficient 2D or 3D near-eye display system.
Figure 6B:
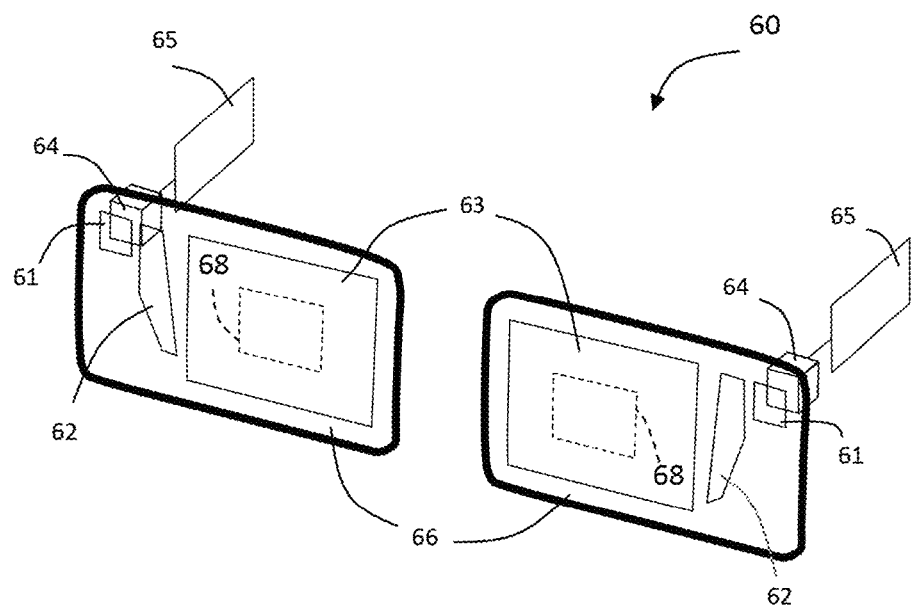
FIG. 6b shows a perspective view where the self-emitting display with drive electronics that are mounted compactly in each temple of the glasses.

As an example, FIG. 6*a* depicts a near-eye display system 60 in which two waveguide substrates 66 are used to deliver digital image content to the viewer's eyes within eyeboxes 68. Similar to the embodiments shown in FIGS. 1-5, each substrate 66 includes input gratings 61, 2D beam expander gratings 62, output gratings 63, and self-emitting microdisplay systems 64 similar to those shown in FIGS. 3-5. Drive electronics 65 provide input to the self-emitting microdisplay systems 64 corresponding to the digital image content being displayed for each eye. Output of the electronics can be formatted and output for 2D content or 3D (stereoscopic) content. Pixel-addressable power requirements of the self-emitting microdisplays 64 require power only as needed to generate illumination corresponding to the output power of pixels composing the images. The drive electronics uses some power for clocking and image formatting functions but this amount of power is generally inconsequential compared to drive power provided to the emitting elements. FIG. 6*b* shows an alternative configuration for a compact near-eye display system. In this case, self-emitting microdisplay systems 64 and associated drive electronics 65 are mounted along the temple of the glasses 80, configuring the system in such a way to resemble conventional eye-wear. Other configurations of the self-emitting microdisplay systems 64 and drive electronics 65 are possible, for example using mirrors to guide the optical path to best match the specific glasses being used.

Figure 7:
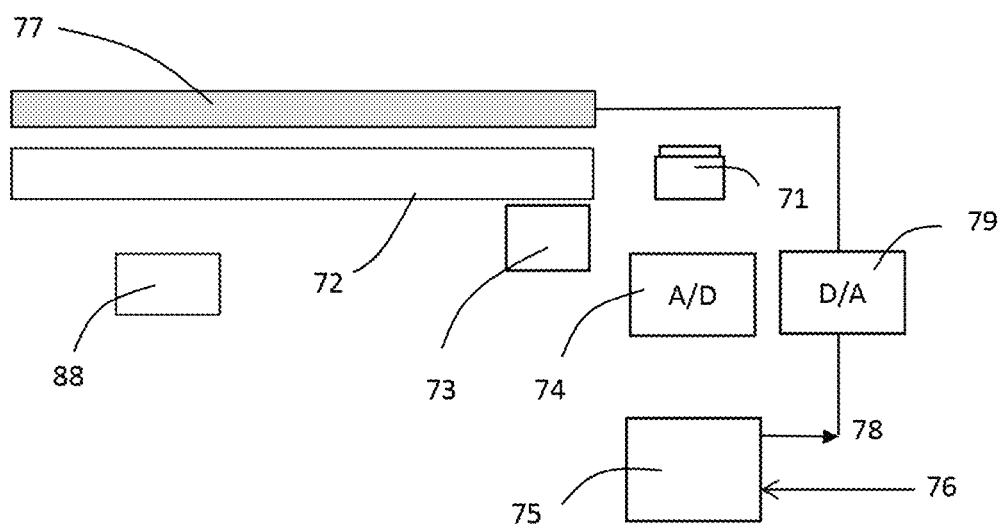
FIG. 7 shows a top view of view of a compact and power efficient 2D or 3D near-eye display system with an electro-optical scene brightness modulator and sensors.

Another embodiment arranged to further reduce power consumption is shown in FIG. 7. In addition to the aforementioned components of the near-eye display system, a light sensor 71 is included to measure ambient illumination. Since waveguide 72 is a transmissive element capable of providing the viewer with an unobstructed field of view within the real world, ambient illumination can significantly affect the perceived contrast ratio of the virtual reality digital content and, in some cases, overwhelm the digital content. Conversely, too high power input to the self-emitting display system 73 can overwhelm a darker ambient environment such as nighttime or indoors conditions. In order to allow effective superposition of digital virtual reality content onto the viewer's unobstructed field of view within eyebox 88 regardless of ambient illumination, the measured power of ambient illumination measured by the light sensor is preferably digitized using A/D system 74, and these data are input to control electronics 75. The power input to the self-emitting display system 73 can be optimized 73 through the use of known algorithms and/or look-up tables 74. This process can happen dynamically in response to both ambient illumination and the digital content 76 to be displayed by the near-eye display system. Since near-eye displays enabled by this invention can be wearable and useful in many settings, dynamic adjustment of the self-emitting display power is very useful as the user moves from one environment to another, e.g. turning a corner from a sunlit to a shadowed sidewalk or entering an elevator from a brightly lit office environment. The dynamic change of input signal to 73 can also result in additional power savings.

Enhanced power savings and an improved user experience can also be achieved using an electro-optical light modulator 77 that transmits a controlled amount of ambient illumination transmitted through the waveguide to the user's eyes. Liquid crystal displays, electro-optical ceramics (e.g. PLZT), electrochromic, electrophoretic modulators are well-known examples of electro-optical light modulators that can be utilized. Control electronics 75 can be used to adjust the modulating effects of the light modulator 77 in response to the output of a light sensor 71. An output digital signal 78 based on both the ambient illumination and virtual reality content can be converted to an analog signal by D/A converter 79 and provided as input to light modulator 77. Additional enhancement of this process can be achieved using a two-dimensional image sensor such as CMOS sensor or CCD sensor for 71 that determines ambient illumination levels within the image space. For example, the direction of a bright reflection from a car spotlight, or indoor lamp may be detected using the image sensor for 71. Based on the location of this ambient illumination relative to the virtual reality content, the signal input to the waveguide can be modified to match spatially the illumination source and compensate for the ambient illumination if needed. In addition, if a pixelated light modulator display 77 is used instead of a simple uniform filter, the spatial optical density of the modulator can be further controlled to selectively filter ambient light depending on position within the display field. The ability to reduce transmitted ambient light, thereby reducing power requirements by the self-emitting display system 73 provides additional power savings to the system.

Having thus described various embodiments of the invention, it will be rather apparent to those skilled in the art that the foregoing detailed disclosure is intended to be presented by way of example only, and various alterations, improvements, and modifications will be apparent to those of skill in the art in accordance with the overall teaching of this invention.

The invention claimed is:

1. An augmented reality near-eye display, comprising:
a transmissive waveguide comprising an optically transmissive substrate having parallel front and back surfaces, wherein an input coupler and an output coupler are located along said transmissive waveguide;
a self-emitting microdisplay system operable to generate images, said self-emitting microdisplay system comprising a two-dimensional image light source having an array of pixels, wherein each pixel of said array of pixels comprises a self-emitting light source operable to emit light as a function of power applied to each said self-emitting light source;

said input coupler operable to direct said light emitted from said two-dimensional image light source into said optically transmissive substrate wherein said light is operable to propagate by internal reflections from said parallel front and back surfaces along said optically transmissive substrate to said output coupler;

said output coupler operable to direct said light out of said optically transmissive substrate to an eyebox within which images generated by said self-emitting microdisplay system are visible as virtual images together with a real-world scene through said parallel front and back surfaces of said transmissive substrate;

a two-dimensional light sensor operable to detect light levels within different portions of said real-world scene; and drive electronics operable to drive each self-emitting light source at a plurality of power levels as a function of said light level within different portions of said real-world scene.

2. The augmented reality near-eye display of claim 1, wherein said two-dimensional image light source is supported on one of said parallel front and back surfaces of said optically transmissive substrate.

3. The augmented reality near-eye display of claim 2, wherein said two-dimensional image light source is oriented to direct said emitted light away from said optically transmissive substrate.

4. The augmented reality near-eye display of claim 3 further comprising a folded optic operable to reflect said emitted light toward said optically transmissive substrate through a positive lens to said input coupler.

5. The augmented reality near-eye display of claim 1, further comprising an electro-optical modulator operable to regulate passage of light from said real-world scene.

6. The augmented reality near-eye display of claim 5, wherein said two-dimensional light sensor and said drive electronics are operable to differentially attenuate local passages of light from said real-world scene to preserve contrast values between said virtual images and said real-world scene.

7. The augmented reality near-eye display of claim 1, wherein said light source is controllable to modulate an average pixel scene brightness.

8. The augmented reality near-eye display of claim 1, wherein said drive electronics are operable to adjust said light output of individual pixels in a first portion of said virtual images with respect to said light output of individual pixels in a second portion of said virtual images in accordance with different detected local light levels within said real-world scene that overlap said first and second portions of said virtual images.

9. A compact, power-saving, near-eye display, comprising:
a transmissive waveguide comprising an optically transmissive substrate having parallel front and back surfaces, wherein an input coupler and an output coupler are located along said transmissive waveguide;
a self-emitting microdisplay system operable to generate images, said self-emitting microdisplay system comprising a two-dimensional image light source having an array of pixels, wherein each pixel of said array of pixels comprises a self-emitting light source operable to emit light as a function of power applied to each said self-emitting light source;
said two-dimensional image light source oriented to emit light in a first direction;

a folded optic operable to direct said emitted light in a second direction, wherein said second direction is toward said input coupler;

said input coupler operable to direct said light emitted from said two-dimensional image light source into said optically transmissive substrate wherein said light is operable to propagate by internal reflections from said parallel front and back surfaces along said optically transmissive substrate to said output coupler;

said output coupler operable to direct said light out of said optically transmissive substrate to an eyebox within which images generated by said self-emitting microdisplay system are visible as virtual images together with a real-world scene through said parallel front and back surfaces of said transmissive substrate;

a two-dimensional light sensor operable to detect light levels within different portions of said real-world scene; and drive electronics operable to drive each pixel overlaying a first portion of said real-world scene having a first light level at a lower power level than each pixel overlaying a second portion of said real-world scene having a second light level, wherein said first light level is lower than said second light level.

10. The compact, power-saving, near-eye display of claim 9, wherein said transmissive waveguide further comprises a beam expander in the form of a grating between said input and output coupler; and wherein said input and output couplers are formed as gratings.

11. The compact, power-saving, near-eye display of claim 9, further comprising an electro-optical modulator operable to regulate passage of light from said real-world scene through said transmissive waveguide.

12. The compact, power-saving, near-eye display of claim 11, wherein said electro-optical modulator includes control electronics operable to differentially attenuate local passages of light from said real-world scene to preserve local contrast values between said virtual images and said real-world scene.

13. The compact, power-saving, near-eye display of claim 9, wherein said folded optic supports successive reflections of said emitted light in two directions and through a positive lens to said input coupler.

14. The compact, power-saving, near-eye display of claim 13, wherein said folded optic is a prism-shaped reflecting structure.

15. The compact, power-saving, near-eye display of claim 14, further comprising a heat sink through which said two-dimensional image light source is mounted in a coplanar fashion on one of said parallel front and back surfaces of said optically transmissive substrate.

16. A method of presenting virtual images overlapping within a real-world scene within an eyebox, comprising steps of:
generating images with a self-emitting microdisplay system, said self-emitting microdisplay system comprising a two-dimensional image light source having an array of pixels, wherein each pixel of said array of pixels comprises a self-emitting light source operable to emit light as a function of power applied to each said self-emitting light source;
directing light emitted from said two-dimensional image light source into an optically transmissive waveguide, wherein said optically transmissive waveguide comprises an optically transmissive substrate having parallel front and back surfaces and an input coupler and an output coupler located along said optically transmissive substrate;

propagating light entering said optically transmissive substrate through said input coupler via internal reflections from said parallel front and back surfaces to said output coupler, wherein said internally reflected light is conveyed to an eyebox within which images generated by said self-emitting microdisplay system are visible as virtual images together with a real-world scene through said parallel front and back surfaces of said transmissive substrate;

detecting light levels within different portions of said real-world scene; and adjusting power applied to each self-emitting light source to modulate amounts of said light emitted from individual pixels of said two-dimensional image light source, whereby power consumption is limited and local contrast values between said virtual images and said real-world scene are adjusted.

17. The method of presenting virtual images overlapping within a real-world scene within an eyebox of claim 16, wherein adjusting power applied to each self-emitting light source includes adjusting said light emitted from individual pixels in a first portion of said virtual images with respect to said light emitted from individual pixels in a second portion of said virtual images in accordance with different detected local light levels within said real-world scene that overlap said first and second portions of said virtual images.

18. The method of presenting virtual images overlapping within a real-world scene within an eyebox of claim 16, further comprising attenuating passage of light from said real-world scene through said waveguide to preserve contrast values between said virtual images and said real-world scene.

19. The method of presenting virtual images overlapping within a real-world scene within an eyebox of claim 16, further comprising differentially attenuating local passages of light from said real-world scene through said waveguide to preserve said local contrast values between said virtual images and said real-world scene.

20. The method of presenting virtual images overlapping within a real-world scene within an eyebox of claim 17, further comprising attenuating passage of light from said real-world scene through said waveguide to preserve said contrast values between said virtual images and said real-world scene.

21. The method of presenting virtual images overlapping within a real-world scene within an eyebox of claim 16, wherein directing light emitted from said two-dimensional image light source into said optically transmissive waveguide includes directing said light emitted from said two-dimensional image light source in a first direction, and reflecting said emitted light using a folded optic in a second direction toward said input coupler.

22. The method of presenting virtual images overlapping within a real-world scene within an eyebox of claim 21, wherein reflecting said emitted light using said folded optic includes successively reflecting said emitted light in two directions for propagation through a positive lens to said input coupler.

23. The method of presenting virtual images overlapping within a real-world scene within an eyebox of claim 21, wherein said two-dimensional image light source is supported in a coplanar fashion on one of said parallel front and back surfaces of said optically transmissive substrate.

24. The method of presenting virtual images overlapping within a real-world scene within an eyebox of claim 21, wherein reflecting said emitted light using said folded optic includes reflecting said emitted light toward said optically transmissive substrate through a positive lens to said input coupler.

* * * * *